United States Patent [19]

Pralus

[11] Patent Number: 5,297,616

[45] Date of Patent: Mar. 29, 1994

[54] HEAT-INSULATED PACKING FOR THE REFRIGERATED OR HOT TRANSPORT OF RECEPTACLES CONTAINING FOOD PRODUCTS

[76] Inventor: Georges Pralus, Rue de la Libération, Briennon, Pouilly Sous Charlieu 42720, France

[21] Appl. No.: 890,258

[22] Filed: May 29, 1992

[30] Foreign Application Priority Data

May 29, 1991 [FR] France ............................. 91 06683

[51] Int. Cl.$^5$ ................. F25D 3/08; F25D 23/12; F24H 7/02; F24H 3/00
[52] U.S. Cl. .................. 165/47; 62/457.1; 62/457.7; 62/457.9; 219/386; 219/387; 165/918; 126/246
[58] Field of Search ............... 62/457.1, 457.2, 382, 62/60, 457.7, 457.9; 219/385, 386, 387

[56] References Cited

U.S. PATENT DOCUMENTS

| | | | |
|---|---|---|---|
| 127,742 | 6/1872 | Connelley et al. | 62/457.1 |
| 934,327 | 9/1909 | Loockerman | 62/457.1 |
| 1,534,087 | 4/1925 | Sellew et al. | 219/386 |
| 1,940,172 | 12/1933 | Hybinette | 219/386 |
| 1,960,747 | 5/1934 | Marks | 62/457.1 |
| 2,543,524 | 2/1951 | De Oliveira | 219/387 |
| 2,662,965 | 12/1953 | Becker | 219/386 |
| 3,482,078 | 12/1969 | Milne | 219/387 |
| 3,538,309 | 11/1970 | Welker | 219/386 |
| 3,799,143 | 3/1974 | Bridges | 219/385 |
| 3,895,215 | 7/1975 | Gordon | 219/386 |
| 4,052,589 | 10/1977 | Wyatt | 62/457.1 |
| 4,236,063 | 11/1980 | Glucksman | 219/386 |
| 4,536,643 | 8/1985 | Erickson | 219/386 |
| 4,775,002 | 10/1988 | Iwamoto | 62/457.2 |
| 4,904,848 | 2/1990 | Colevas | 219/387 |

FOREIGN PATENT DOCUMENTS

| | | | |
|---|---|---|---|
| 653615 | 11/1937 | Fed. Rep. of Germany . | |
| 2755627 | 6/1979 | Fed. Rep. of Germany . | |
| 639912 | 7/1928 | France | 219/385 |
| 1031395 | 3/1953 | France . | |
| 301586 | 10/1932 | Italy | 62/457.1 |

*Primary Examiner*—John K. Ford
*Attorney, Agent, or Firm*—Bacon & Thomas

[57] ABSTRACT

The present invention relates to a heat-insulated packing for transporting at least one receptacle containing food products. The packing comprises a box constituted by a series of removable heat-insulated trays mounted in superposed manner, between the lid and a bottom, and held together with the aid of assembly means, so as to constitute a closed heat-insulated box, the trays each being equipped with structure for supporting and centering at least one receptacle.

9 Claims, 3 Drawing Sheets

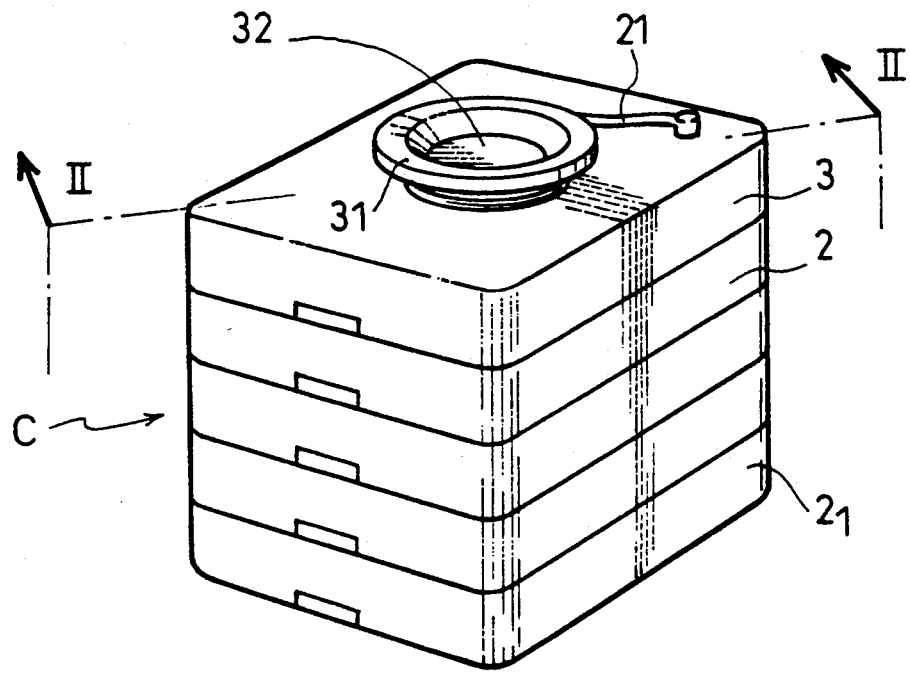
fig_1
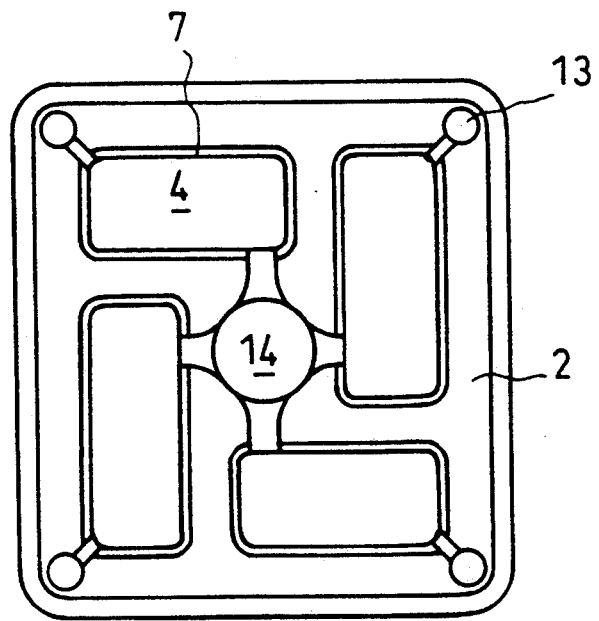
fig_4

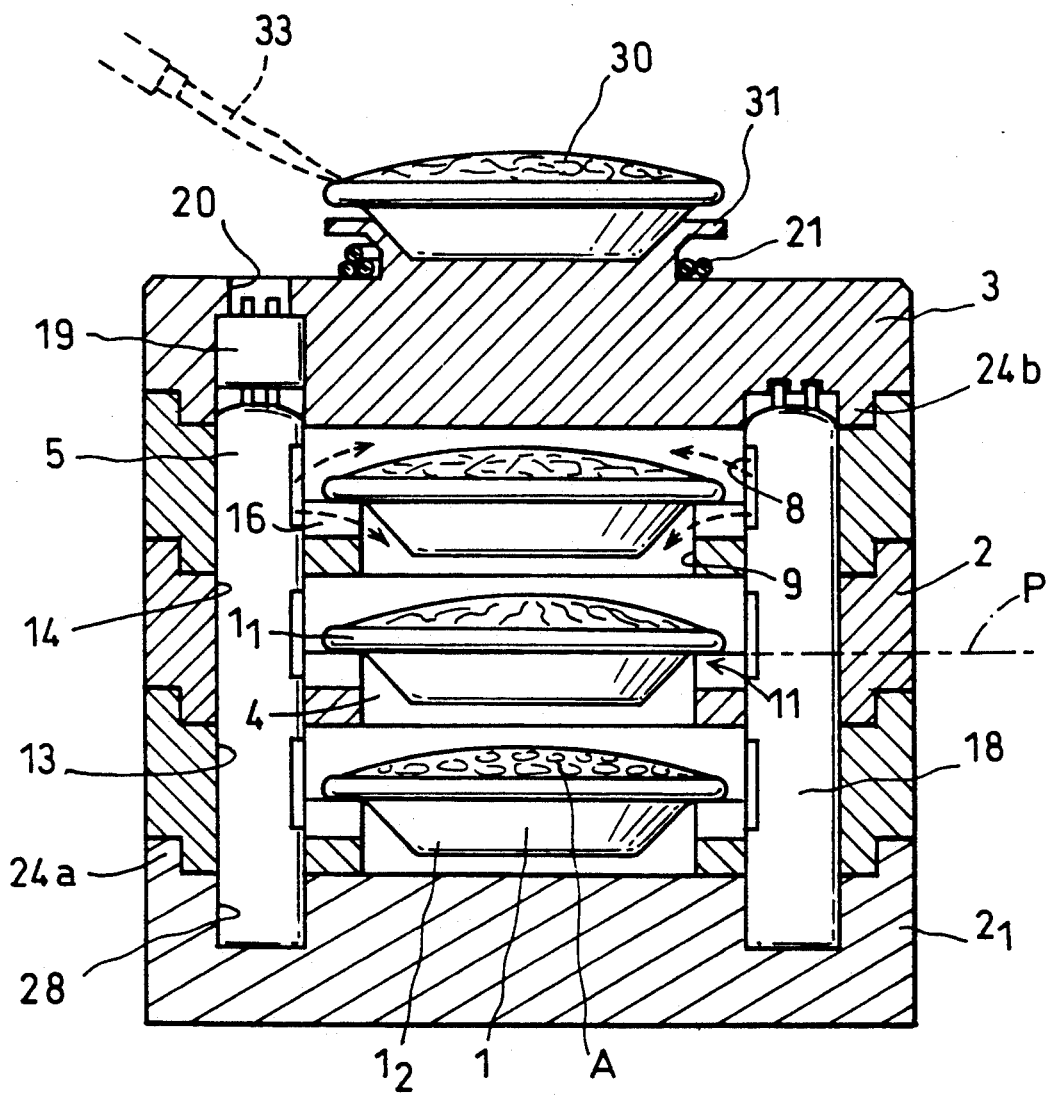
fig_2

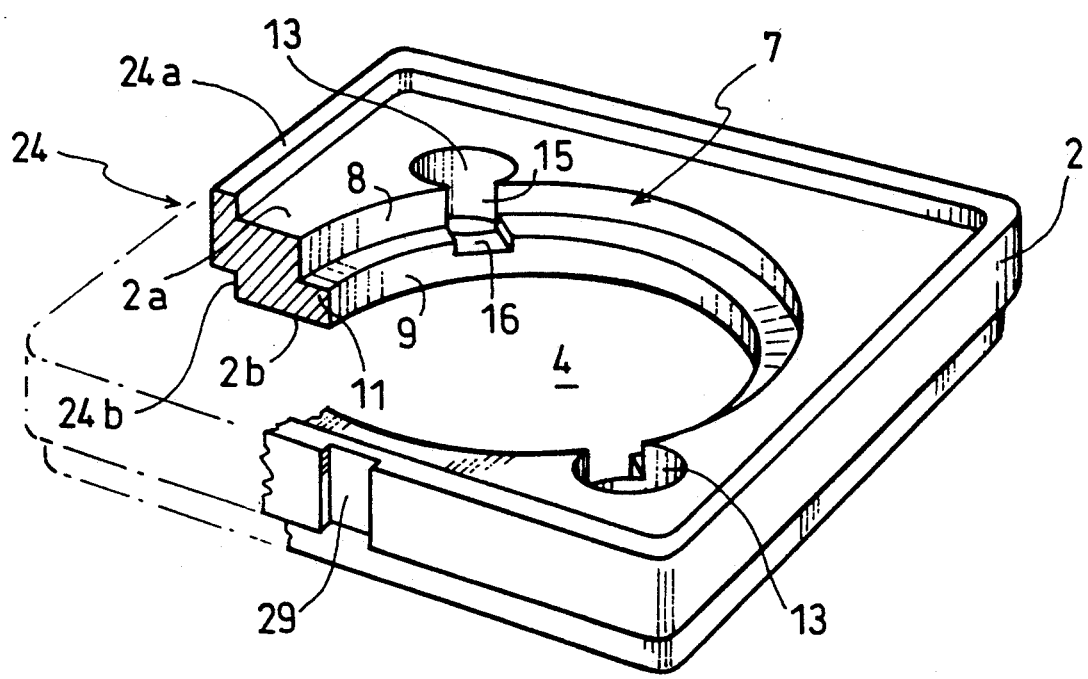
fig_3

HEAT-INSULATED PACKING FOR THE REFRIGERATED OR HOT TRANSPORT OF RECEPTACLES CONTAINING FOOD PRODUCTS

FIELD OF THE INVENTION

The present invention relates to the technical domain of heat-insulated packings or containers designed for transporting receptacles in the general sense, such as plates, dishes or bowls adapted to contain foodstuffs or products of diverse nature.

BACKGROUND OF THE INVENTION

The state of the art has already proposed various heat-insulated packings for transporting foodstuffs. To that end, it is well known to use an ice-box in the form of a hermetically closed box, lined with insulating material and adapted to receive ice to maintain, in the internal volume of the box, a low temperature favourable to the preservation of food products.

This type of packing is not satisfactory in numerous practical uses, such as the transport of food products in the form of plates or dishes containing food products ready to be eaten. In such a box is not designed to maintain the receptacles containing food in stable position, during transport, with the result that the food is not intact at the end of transport. From using this type of packing, it is observed that this box is preferably reserved for transporting food previously placed in hermetically closed boxes, which generally means that, before being eaten, the food must be removed therefrom and placed on a plate, dish or the like.

Therefore, this packing does not ensure transport, without damage, of these decorated cooked dishes, between the place of manufacture or production and the place of consumption. Furthermore, the use of this packing which is exclusively designed to preserve food products at a cold temperature, involves manipulating the receptacles, and even the food products, to place them in a heating device before the food is eaten.

The need is therefore felt for a heat-insulated packing designed to protect the receptacles containing food products ready to be eaten, so as to conserve intact the food products during transport thereof, while offering the possibility of placing the receptacles containing the food directly at a cold or hot or succcessively cold and hot temperature.

SUMMARY OF THE INVENTION

To attain this object, the packing for transporting at least one receptacle containing food products, comprises a box closed by a lid and internally defines an enclosure communicating with a source of production of a cold or hot fluid. According to the invention, the box is constituted by a series of removable heat-insulated trays mounted in superposed manner between the lid and a bottom, nd maintained together with the aid of assembly structure, so as to constitute a closed heat-insulated box, the trays each being equipped for supporting and centering at least one receptacle.

The packing is advantageously constituted by a series of removable trays mounted in superposed manner-and maintained together with the aid of assembly structure. Such a packing ensures transport under stable conditions of a series of receptacles whose number is adapted as desired as a function of the desired capacity of transport.

According to another advantageous embodiment of the invention, each tray comprises at least one orifice communicating with the corresponding enclosure and opening out on the two principal faces of the tray, the orifices of the trays being aligned, when the trays are in superposed position, so as to constitute a channel intended to communicate with the source of hot or cold production, positioned outside the packing or added in the channel.

The channel is preferably adapted to receive a cartridge for producing a cold and/or hot fluid, connected to an electric voltage means.

The object of the present invention finds a particularly advantageous application for transporting plates or dishes containing fresh or frozen food products prepared by a caterer, restaurant or cook working individually, semi-industrially or industrially.

BRIEF DESCRIPTION OF THE INVENTION

The invention will be more readily understood on reading the following description with reference to the accompanying drawings, in which:

FIG. 1 is a perspective view showing a packing according to the invention.

FIG. 2 is a view in section taken substantially along line II—II of FIG. 1.

FIG. 3 is a view in perspective, with parts torn away, showing an embodiment of a tray forming part of the packing according to the invention.

FIG. 4 is a plan view from above showing another embodiment of a tray forming part of the packing according to the invention.

DETAILED DESCRIPTION OF THE DRAWINGS

Referring now to the drawings, and firstly to FIGS. 1 and 2, the packing according to the invention is adapted for transporting at least one receptacle 1, such as for example a bowl, dish or, in the example illustrated, a plate, containing food products A in the general sense. The packing according to the invention is constituted by at least one and, in the example illustrated, by four superposed trays 2, each made of a heat-insulating material, such as for example polystyrene. The trays 2 thus form a heat-insulated box C of which the lowest tray 21 constitutes the bottom. Such a box is hermetically closed by a lid likewise made of a heat-insulating material, identical or not to the one constituting the trays 2.

As is more precisely apparent in FIGS. 2 and 3, each tray 2 is removable and constitutes a tray for centering and supporting at least one receptacle 1. Each tray 2 defines, around the receptacle thus positioned, a chamber, volume or enclosure 4 communicating with a source 5 of production-of a cold or hot fluid. Each tray 2 is arranged to present means performing a function of positioning, support and centering of a respective receptacle 1, advantageously but non-exclusively effected by a recess 7 made in the tray. Each recess 7 preferably opens on the two opposite principal faces 2a, 2b of the tray, thus allowing communication of the enclosure 4 defined by the recess, with the enclosure or enclosures 4 formed by the recesses of the adjacent trays. In the example illustrated, each recess 7 is formed by an opening 8 opening on the upper face 2a of the tray and extended by an opening 9 opening on the lower face 2b of the tray. Opening 8 presents a transverse section of passage larger than that of opening 9, so as to define therebetween a shoulder 11 on which the edge $1_1$ of an upper section of the receptacle 1 rests.

Of course, the section of passage of opening 8 is larger than the maximum section presented by the plate, whilst opening 9 presents a section of passage larger than that of the lower section or bottom $1_2$ of the receptacle 1, so that, in position of stable hold, the edge $1_1$ and the bottom $1_2$ of the are established respectively at the level of opening 8 and opening 9. Consequently, the height of each tray 2 is chosen so as to be greater than the height of the receptacle, possibly increased by the height of the food rising above the edge of the receptacle, in order to allow superposition of the trays whilst maintaining the food intact. Furthermore, each cavity 7 presents a suitable contour which, is preferably complementary to that of the receptacle 1 that it must support. In this way, the cavity may be circular, oval or polygonal. Moreover the cavity may present a profile adapted to the receptacle to be positioned. By way of example, the cavity may be defined by a frustum of cone profile of which the smaller base opens towards the lower face of the tray, so as to support a bowl for example.

It must be considered that each cavity 7 may be made either directly in the tray 2 or in a plate added to the tray. This latter possibility offers the advantage, simply by changing plates, of having a large range of cavity profiles adapted to the various shapes that the receptacles 1 may present. It may also be provided to add this type of plate on the cavity made initially on the tray.

Each tray 2 advantageously comprises at least one and, in the example illustrated, two orifices 13 communicating with the enclosure 4 and opening on the two principal faces 2a, 2b of the tray. For each tray, the two orifices 13 are preferably made in two opposite corners. When the trays 2 are in superposed position, the orifices 13 are aligned so as to constitute, as illustrated in FIG. 2, a channel 14 forming with the enclosures 4 of the trays a fluid circulation circuit.

Each orifice 13 of a tray communicates with the corresponding enclosure 4, with the aid of at least one passage 15 opening out above and below a plane P of the support for the receptacle 1 which, in the example illustrated, passes at the level of the shoulder 11. To ensure communication between the orifice 13 and that part of the enclosure 4 placed below the recipient 1, each orifice 13 is extended by an undercut 16 made at the level of the opening 9. The two channels 14 each communicate with the enclosures 4 which also communicate together so as to form a circuit for the circulation of a cold or hot fluid. Such a fluid is conducted, with the aid of the source 5, to the level of the channels 14 which communicate with the enclosures, via passages 15. In the example illustrated, the source 5 is constituted by cartridges 18 each located inside as associated channel 14. Each cartridge 18 is adapted to produce a cold fluid and may be constituted in this respect by a cryogenic, quicklime, iced water, etc. cartridge.

A cartridge 18 may advantageously be used which is also adapted to produce a hot fluid for raising the temperature of the food products contained in the recipients 1. By way of example, it may be provided to use a cartridge 18 comprising a volume of iced water associated with a capillary. This cartridge is connected via a connector 19 to an electric voltage unit so as to obtain evaporation of the water. The connector 19 is advantageously mounted inside an orifice 20 made in the lid to extend in line with at least one channel 14. The connector 19 is connected to an electric voltage unit via a cord 21 (FIG. 1).

It may, of course, be provided to employ other sources of production of a cold or hot fluid mounted inside or outside the packing. For example, in one embodiment (not shown), the connector 19 may be replaced for example by a cap accessible from outside the lid to allow introduction of a cold or hot fluid supplied by an appropriate source delivering a non-noxious cryogenic product (nitrogen or $CO_2$) or a calorific fluid, respectively. The fluid produced by the hot or cold source is caused to circulate from the orifices 12, in the enclosures 4, namely below and above the receptacle, so as to cool or heat, respectively, the food products contained in the receptacles 1. It should be noted that the flux circulating above a receptacle 1 makes it possible to cool or heat the bottom of an upper receptacle and vice versa. The fluid circulation circuit thus created inside the packing enables the receptacles 1 and food A to be completely bathed externally by the fluid, with the result that thorough cooling or heating of the food products may be obtained.

The packing according to the invention thus allows receptacles containing food products to be transported at a temperature favourable for preservation of the food and, at the appropriate time, enables the dishes to be heated, if necessary, without requiring particular manipulations. The receptacles are then withdrawn from their tray to allow the food products ready for consumption to be eaten.

The packing according to the invention may advantageously be constituted by a series of superposed trays 2 which are maintained together by an assembly 24. Each assembly 24 is preferably, but non-exclusively, of the interfitting type, formed on the principal faces 2a, 2b of the tray. By way of example, face 2a of each tray comprises a peripheral tongue 24a, whilst the lower face 2b of the tray is provided with a complementary peripheral groove 24b. The tongue 24a of one tray is intended to cooperate with the groove 24b of an upper tray. Of course, the lid 3 is also provided with a groove 24b, whilst the bottom $2_1$ is equipped with a tongue 24a.

The packing according to the invention is constituted simply by superposing the bottom $2_1$, at least one tray 2 and the lid 3. These constituent elements, which are made of a heat-insulating material, thus form a compact, easily transportable, heat-insulated box. The bottom $2_1$ preferably comprises a blind hole 28, arranged to be aligned with each orifice 13 of the upper tray, with a view to receiving a cartridge 18 and ensuring a connection between the trays 2 and the bottom $2_1$. In order to increase the mechanical strength of the packing thus formed, it may be provided to envelop the assembly with a retractable cover whose removal is facilitated by the production of a vertical groove 29 cut out in the edge of the trays. Of course, although this has not been shown, it may also be provided to make a recess 7 for centering and supporting a recipient 1, in the bottom tray $2_1$.

As appears more precisely in FIGS. 1 and 2, the packing according to the invention is particularly adapted to keep cold and heat up receptacle 1 containing frozen food products covered with a protective film 30. To allow this protective film to be easily removed, the lid 3 is advantageously provided, on its upper face, with a plate 31 in which c 32 is made for receiving the bottom of the receptacles, enabling the receptacles to be positioned and supported while the film is being removed with the aid, for example, of a cutting blade 33 shown in broken lines in FIG. 2. The plate 32 preferably, but non-exclusively, extends at a distance from the surface of the lid so as to form a space for receiving the connecting cord 21.

FIG. 4 illustrates an embodiment of a tray 2 designed to hold several receptacles 1. By way of example, tray 2 comprises four centering cavities 7 each communicating with an orifice 13 and with a central channel 14 in which a fluid is introduced by any appropriate means described hereinabove.

The invention is not limited to the examples described and shown, as various modifications may be made thereto without departing from its scope.

What is claimed is:

1. A packing assembly for transporting food products comprising:
    a bottom member;
    a lid member; and
    a plurality of heat-insulated trays, each of said trays including upper and lower surface portions and a cavity extending entirely through the tray from said upper surface portion to said lower surface portion;
    assembly means for removably locating said plurality of trays in a superposed manner between said bottom member and said lid member so as to define a closed, heat-insulated box with the cavity of each of said plurality of trays being vertically aligned;
    at least one receptacle adapted to contain a food product to be transported, said at least one receptacle including an upper section and a lower section with said upper section adapted to be supported by a respective one of said trays with said lower section thereof extending into at least one of said cavities;
    means for supplying cold or hot fluid into said box; and
    means for circulating the cold or hot fluid from said supplying means within said box, said circulating means providing for direct contact of the cold or hot fluid with both the upper and lower sections of said at least one receptacle.

2. The packing assembly of claim 1, wherein said circulating means further includes at least one orifice extending through each of said trays such that when said plurality of trays are superposed, the orifices of said trays are aligned and form a common fluid flow channel for the delivery of the cold or hot fluid.

3. The packing assembly of claim 2, wherein said circulating means further includes at least one passage formed in each of said plurality of trays, said at least one passage extending between said at least one orifice and said cavity of its respective tray.

4. The packing assembly of claim 3, wherein each of said passages opens into its respective cavity both above and below said upper surface portion of its respective tray.

5. The packing assembly of claim 2, wherein said means for supplying cold or hot fluid into said box comprises a cold or hot fluid producing cartridge mounted within said channel.

6. The packing assembly of claim 5, wherein said lid member is provided with at least one orifice that is aligned with said channel, said at least one orifice in said lid member having secured therein a connector for electrically interconnecting said cold or hot fluid producing cartridge with a source of electrical power.

7. The packing assembly of claim 1, further including a plate carried by said lid member for positioning and supporting said at least one receptacle.

8. The packing assembly of claim 1, wherein said assembly means includes complementary surface sections formed with each of said plurality of trays, said bottom member and said lid member, said complementary surface sections structurally interfitting said bottom member, said plurality of trays and said lid member.

9. The packing assembly of claim 1, wherein each of said trays includes a shoulder located between said upper and lower surface portions and extending about said cavity such that the upper section of said at least one receptacle can be supported on said shoulder.

* * * * *